US008839189B2

(12) United States Patent
Thies et al.

(10) Patent No.: US 8,839,189 B2
(45) Date of Patent: Sep. 16, 2014

(54) SERVICE VARIANTS FOR ENTERPRISE SERVICES

(75) Inventors: Knut Thies, Tholey-Uberroth (DE); Anne Jacobi, Wieslock (DE); Ingo Kober, Heidelberg (DE); Michael Schmitt, Reichelsheim (DE); Bertram Vielsack, Malsch (DE); Ruediger Karl, Waibstadt (DE); Sven Kruppel-Berndt, Dielheim (DE)

(73) Assignee: SAP AG, Walldorf (DE)

( * ) Notice: Subject to any disclaimer, the term of this patent is extended or adjusted under 35 U.S.C. 154(b) by 1086 days.

(21) Appl. No.: 12/570,533

(22) Filed: Sep. 30, 2009

(65) Prior Publication Data

US 2011/0078654 A1    Mar. 31, 2011

(51) Int. Cl.
G06F 9/44 (2006.01)
G06Q 10/10 (2012.01)
G06Q 10/08 (2012.01)

(52) U.S. Cl.
CPC .............. G06Q 10/10 (2013.01); G06Q 10/087 (2013.01)
USPC ......................................... 717/106; 715/223

(58) Field of Classification Search
USPC ........................................................ 717/106
See application file for complete search history.

(56) References Cited

U.S. PATENT DOCUMENTS

| | | | |
|---|---|---|---|
| 6,442,373 B1* | 8/2002 | Benveniste | 455/67.11 |
| 2002/0138353 A1* | 9/2002 | Schreiber et al. | 705/26 |
| 2003/0018668 A1* | 1/2003 | Britton et al. | 707/513 |
| 2005/0071359 A1* | 3/2005 | Elandassery et al. | 707/102 |
| 2006/0206883 A1* | 9/2006 | Sabbouh | 717/146 |
| 2006/0230032 A1* | 10/2006 | Brankov et al. | 707/3 |
| 2007/0150855 A1* | 6/2007 | Jeong | 717/106 |
| 2007/0257247 A1* | 11/2007 | Ando et al. | 257/3 |
| 2008/0178043 A1* | 7/2008 | Xu | 714/32 |
| 2009/0055686 A1* | 2/2009 | Tsang | 714/33 |
| 2009/0083079 A1* | 3/2009 | Law et al. | 705/4 |

* cited by examiner

*Primary Examiner* — Henry Tsai
*Assistant Examiner* — John Roche
(74) *Attorney, Agent, or Firm* — Fish & Richardson P.C

(57) ABSTRACT

Implementations of the present disclosure include executing a business application on a server device, the business application executing a service based on a base plurality of inputs, accessing a first service variant based on the service, generating a first plurality of input fields based on the first service variant, the first plurality of input fields corresponding to a first plurality of inputs, the first plurality of inputs being a sub-set of the base plurality of inputs, and executing the service based on the first plurality of inputs that is input using the first plurality of input fields.

21 Claims, 8 Drawing Sheets

FIG. 4

SERVICE VARIANTS FOR ENTERPRISE SERVICES

BACKGROUND

An enterprise service oriented architecture is an open architecture that a company can use to implement adaptive business solutions. The use of a service oriented architecture in a business solution by a company can allow for business efficiency and flexibility. An integrated technology platform can be built using a service oriented architecture. The platform can use web services to support interoperable machine-to-machine interaction over a network. The company can use the integrated platform as a technical foundation for its business applications.

An enterprise software supplier can provide business applications based on a service oriented architecture. For example, SAP® Business Suite applications by SAP AG include a bundle of business services that can provide integration of information and processes, along with collaboration, industry-specific functionality and scalability. The SAP® Business Suite applications can use a SAP NetWeaver® technology platform by SAP AG that is built using a SAP Enterprise Service Oriented Architecture (Enterprise SOA) by SAP AG. The Enterprise SOA is an open architecture for adaptive business solutions. The SAP NetWeaver® platform can provide a development and runtime environment for SAP® Business Suite applications. The SAP NetWeaver® technology platform can be used for custom development and integration with other applications and systems.

SUMMARY

Implementations of the present disclosure provide a computer-implemented method including executing a business application on a server device, the business application executing a service based on a base plurality of inputs, accessing a first service variant based on the service, generating a first plurality of input fields based on the first service variant, the first plurality of input fields corresponding to a first plurality of inputs, the first plurality of inputs being a sub-set of the base plurality of inputs, and executing the service based on the first plurality of inputs that is input using the first plurality of input fields.

In some implementations, the method further includes providing a default input defined by the first service variant, the default input corresponding to an input of the base plurality of inputs, wherein executing the service is further based on the default input.

In some implementations, generating the first service variant includes establishing a base plurality of input fields that can be presented to a user, the base plurality of input fields corresponding to the base plurality of inputs, and at least one of setting a default value for an input of the base plurality of inputs, setting a fixed value for an input of the base plurality of inputs, hiding an input field of the base plurality of input fields when presenting the base plurality of input fields to the user, defining an optional input field of the base plurality of input fields as a mandatory input field, and renaming an input field of the base plurality of input fields.

In some implementations, the method further includes accessing a second service variant to generate a second plurality of input fields, the second plurality of input fields corresponding to a second plurality of inputs, the second plurality of inputs being a sub-set of the base plurality of inputs and having at least one input in common with the first plurality of inputs, and executing the service based on the second plurality of inputs that is input using the second plurality of input fields.

In some implementations, the method further includes executing a service variant editor that is used to generate the first service variant.

In some implementations, the method further includes generating a web service definition language (WSDL) document based on the first service variant, the WSDL document being a model that describes the service executed by the enterprise service application, configuring a web service based on the first service variant to support client-server interaction over a network, and generating glue coding based on the first service variant.

In some implementations, the method further includes generating a first plurality of output fields in response to execution of the service, the first plurality of output fields being based on the first service variant and being a sub-set of a base plurality of output fields associated with the service Implementations of the present disclosure further provide a computer-readable storage medium coupled to one or more processors and having instructions stored thereon which, when executed by the one or more processors, cause the one or more processors to perform operations in accordance with implementations of the methods provided herein.

Implementations of the present disclosure also provide a system including a server that hosts a business application that executes a service based on a base plurality of inputs, and a computer-readable storage medium coupled to one or more processors having instructions stored thereon which, when executed by the one or more processors, cause the one or more processors to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 4 is a screen-shot illustrating a properties tab of an exemplar editor for a service variant.

DETAILED DESCRIPTION

Figure 1:
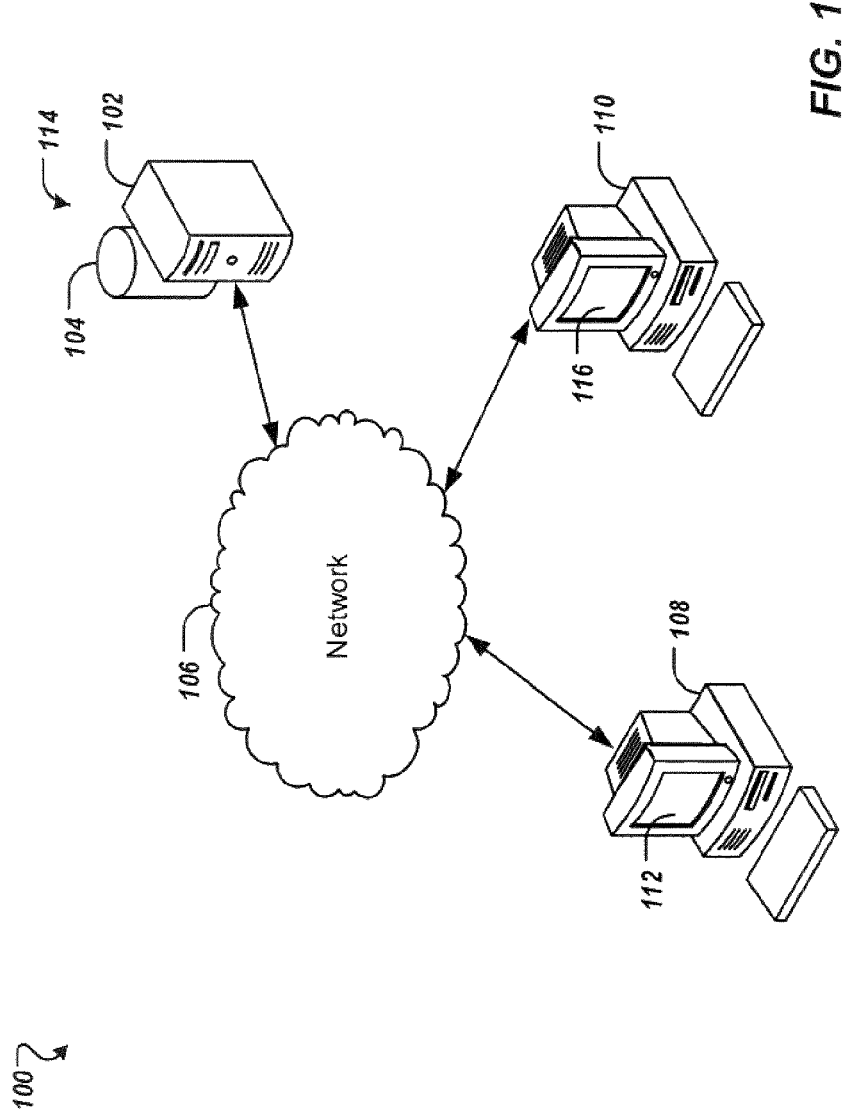
FIG. 1 is a schematic illustration of an exemplar network architecture in accordance with implementations of the present disclosure.

Referring now to FIG. 1, a schematic illustration of an exemplar system 100 in accordance with implementations of the present disclosure can include a computer system 114. The computer system 114 can include an application server 102 and a database 104. The system 100 can include a plurality of clients 108, 110. The computer system 114 and the clients 108, 110 can be connectively coupled to and communicate with one another over a network 106.

In some implementations, the system 100 can be a distributed client/server system that spans one or more networks such as network 106. In some implementations, each client (e.g., clients 108, 110) can communicate with the application server 102 via a virtual private network (VPN), Secure Shell (SSH) tunnel, or other secure network connection. In some implementations, the network 106 can include the Internet, a wireless service network and may also include the Public Switched Telephone Network (PSTN). In other implementations, the network 106 may include a corporate network (e.g., an intranet) and one or more wireless access points.

Each client (e.g., clients 108, 110) can establish its own session with the application server 102. Each session can be semi-permanent as it can be established at one point in time and torn down at another. Each session can involve two-way information exchange between the computer system 114 and each individual client 108, 110. For example, a Hypertext Transfer Protocol (HTTP) session can enable the association of information with individual users.

A session can be stateful where at least one of the communicating parts (e.g., the application server 102 or the client (e.g., clients 108, 110)) can save information about the session history to be able to communicate. Alternatively, stateless communication includes independent requests with associated responses.

Multiple clients (e.g., clients 108, 110) can communicate via network 106 with the application server 102. In order to run an application, each client (e.g., clients 108, 110) can establish a corresponding session with the application server 102. For example, a user can invoke an application available on the application server 102 from the client 108. The user can interact with the application by way of a user interface provided to the user by the application. For example, a display device (e.g., display device 112) can display the user interface to the user. The user can select and enter inputs, which can be parameters or values needed for the operation of the application. Similarly, a user of client 110 can also invoke an application on their client and the application can provide a user interface on a display device 116. Each application on each client can establish a unique HTTP session with the application server 102. Each application can individually access data from the database 104 as well as supply data to the database 104.

A company can provide a plurality of business applications directed towards particular business needs. For example, a company can provide business applications that perform enterprise services (e.g., industry specific and business support services) that can include but are not limited to customer relationship management, enterprise resource planning, product lifecycle management, supply chain management and supplier relationship management. For example, the SAP® Business Suite applications can perform these enterprise services. The applications can run on a SAP Web Application Server (WebAS) by SAP AG, which is included in the SAP® Netweaver technology platform. For example, the SAP® Netweaver technology platform can be included on the application server 102.

In some implementations, a client (e.g., clients 108, 110) can access business applications running on the application server 102. For example, the client 108 can establish a communication session with the application server 102 that can use web services. A user, by way of the client, can select to run a business application available on the application server 102. The client 108 can provide a user interface (e.g., a graphical user interface (GUI) presented on a display device on the client (e.g., display device 112)) to the selected business application to the user. The interface can enable the user to enter, change, delete and confirm inputs and operations associated with the business application. The application can be a business application that uses an integrated platform based on a service oriented architecture (e.g., a SAP® Business Suite application running on the SAP NetWeaver® technology platform that is built using the SAP Enterprise SOA).

Enterprise services may require the use of a complex service interface. For example, a user may be required to enter a large number of inputs for a selected service. The complexity of the service interface and the need for a large number of inputs can be the result of a requirement to match a variety of different use cases for a service as well as to enable a high degree of reuse of services. In some implementations, the complex service interface can be difficult for a user to interact with and understand. For example, the user may not know the correct input for each input field for the selected service. In some implementations, a user may use the enterprise service for a specific business purpose. In this implementation, the user may have difficulty determining which inputs for the service are relevant for their specific business purpose.

A customer can utilize a variety of enterprise services within their business. In some implementations, a plurality of users can be responsible for interfacing with the enterprise services for the customer. An enterprise service can present a simplified interface to a user that includes a subset of the inputs for the enterprise service. For example, a user interface can present to a user the relevant inputs for their identified specific business purpose. The customer can pre-configure the remaining inputs to be compatible with their business needs. These inputs can be given fixed or default values selected by the customer that are not entered by the user. In another example, a user may enter inputs for their identified specific business purpose in a form, report or other type of document for use by the enterprise service. In another example, a user may enter inputs for their identified specific business purpose in a local user test environment that can interface to the enterprise service.

In some implementations, a client (e.g. clients 108, 110) can access one of a plurality of SAP® Enterprise Resource Planning (ERP) applications, which can be included in the SAP® Business Suite applications available on the application server 102. The SAP® ERP applications can provide services related to the integration of a variety of enterprise functions. For example, a customer may select to run a SAP® ERP application that can perform an enterprise service that reads inventory information (e.g., a Find Inventory by Location and Material inventory information service). In this example, the service interface for the inventory information service can include fifty four (54) inputs, for example. The inventory information service can include inventory information from a plurality of enterprise functions. For example, the inventory information service can include information related to organizational levels, stock types, and special stocks.

In some implementations, a customer may be interested in a subset of the information provided by the inventory information service. For example, a customer may be interested in the unrestricted stock on a plant level for a single material. This can result in the relevancy of only six (6) of the fifty four (54) inputs in the service interface for the inventory information service (e.g., a Find Inventory by Location and Material inventory information service).

In some implementations, an enterprise software supplier can modify an enterprise service according to a company's specifications creating a new implementation of the enterprise service. For example, the enterprise service provider can modify the application code for a specific enterprise service to include relevant inputs in a user interface and to pre-configure the remaining inputs no longer needed in the user interface as required by the customer. In some implementations, this may result in a plurality of various customized versions of the enterprise service that require specific implementations per user.

An enterprise service can be an object-oriented program that utilizes modular objects. In some implementations, the enterprise service can be used as a base service and the creation of an additional object, referred to as a service variant, can be introduced in a layer above the base service in order to generate a customized version of the enterprise service for a customer. The additional layer can function as a filter to the base service. An interface to the service variant can be based on the interface of the base service. The service variant interface can expose customer-identified relevant inputs for the base service to the user, and/or customer-identified relevant outputs. The service variant can configure the remaining inputs that are no longer included in the service variant interface without exposing them to the user (e.g., hiding them from the user), as well as the remaining outputs. The service variant can provide the inputs needed by the base service to the base service as a combination of user inputs and pre-configured inputs, and can provide the outputs provided by the base service in response to a service request.

In some implementations, a customer can create a service variant for an enterprise service on an as needed basis without the enterprise software supplier generating a modified version of the enterprise service. The creation of a service variant can provide the customer with the ability to reduce a service interface to an enterprise service to the inputs needed for a customer-specific business need. For example, a customer using a client (e.g., clients 108, 110) can create and access a service variant that is part of an enterprise service running on the application server 102. The client (e.g., clients 108, 110) can access the application server 102 by way of the network 106.

In some implementations, the enterprise software supplier can create a service variant according to a customer's specification. The creation of a service variant to simplify the use of an enterprise service can be faster and more cost effective than creating a customized version of the enterprise service.

The interface for a service variant can be based on the interface for the base service. The service variant can simplify the use of an enterprise service by reducing the number of inputs a customer needs to enter for the enterprise service. This can result in a simplified service interface for an existing enterprise service. For example, a new service variant can be based on an enterprise service included in the SAP® Business Suite applications. The service variant can be implemented in the SAP NetWeaver® technology platform.

A technology platform can implement a service variant. Using a service variant editor, the customer can modify the state of the fields for inputs, operations and output structures for a base enterprise service to create a service variant definition. The technology platform can generate a WSDL document based on the service variant definition. The technology platform can configure a service variant web service. The technology platform can provide glue coding between the service variant and the base enterprise service, which is called at runtime. The glue coding can be generated upon the first instance of executing the service variant, and can be stored to be accessed upon future instances of executing the service variant. If a pre-existing service variant is modified, the glue coding can be regenerated upon the first instance of executing the modified service variant.

The technology platform can create and maintain a service variant using the service variant editor. The service variant editor is a user interface that enables a customer to select and modify the controls, settings and inputs for a selected base service in order to create the service variant. The service variant editor can be included in a development workbench (e.g., Advanced Business Application Programming (ABAP™) Workbench (se80) by SAP AG). The service variant editor can be accessible from a development platform included in a technology platform (e.g., SAP Net Weaver® technology platform) available on an application server (e.g., application server 102 in FIG. 1). For example, the ABAP™ Workbench (se80) can include the service variant editor. A new ABAP™ transaction and an associated transaction code can be created for the service variant editor (e.g., SVAR).

For example, a user can select a business application for an enterprise service and then invoke the service variant editor. When the creation of a service variant for the selected enterprise service begins, (e.g., the customer invokes the ABAP™ transaction code SVAR in the ABAP™ Workbench (se80)), the service variant editor can display the service interface for the selected enterprise service (e.g., the base service). The service interface can include a plurality of fields for inputs, operations and output structures. For example, inputs can include data and information used by the enterprise service (e.g., facility names, number of available goods, etc.). Operations can include the selection by a user of specific operations performed by the enterprise service (e.g., inventory count per location, depreciation costs, etc.). Output structures can be data and information provided to the user at the completion of the enterprise service (e.g., reports).

The customer, using the service variant editor, can simplify the service interface by reducing the number of inputs and operations a user may enter in order to run the enterprise service. For example, a plurality of fields corresponding to a plurality of inputs can be defined, where the plurality of inputs include a sub-set of the base inputs provided in the base service interface.

Using the service variant editor, a customer can hide (e.g., not display to the user) selected fields for input as well as output structures that may not be required by the service variant. Using the service variant editor, a customer can set fixed and default values for inputs in the service interface. Using the service variant editor, a customer can define an optional field in the service interface as a mandatory field in the service variant. Using the service variant editor, a customer can rename fields in the service interface, define additional security settings for the enterprise service, and restructure and flatten data types used by the enterprise service. Additionally, a customer, using the service variant editor, can change the existing classification as well as create a new classification for the service variant for use in a service registry or a Universal Description, Discovery and Integration (UDDI) query.

In some implementations, a technology platform can provide tools for using and generating WSDL definitions. When a customer has completed the configuration of the service variant using the service variant editor, the technology platform can create a WSDL model based on the service variant configuration. The technology platform can generate a WSDL document for the service variant, which can be a description of the new smaller adapted enterprise service. WSDL is an Extensible Markup Language (XML) format that can describe web service interfaces used in a technology platform. For example, the SAP NetWeaver® technology platform can provide tools for using and generating WSDL documents. For example, the WSDL document for the service variant can include a PortType name, different from the PortType name of the base service. Additionally, the WSDL document for the service variant can include a reduced number of data types (e.g., XML Schema Document (xsd) data types) as compared to the WSDL document for the base service.

Referring again to FIG. 1, an application server (e.g., application server 102) can host a web service. A web service can be a self-contained, modularized, executable entity that can be published, searched for, and accessed across a network (e.g., network 106) by a caller (e.g., clients 108, 110) or a sender (e.g., application server 102). A web application server (e.g., SAP WebAS) can expose and integrate web services. A technology platform (e.g., SAP NetWeaver®) can provide an environment for publishing, discovering, and accessing web services. This can allow the web application server to act both as a "server" and as a "client" for web services.

A web application server (e.g., SAP WebAS) can integrate web services using a WSDL document as input for generating a web service client. In some implementations, the web application server can use the WSDL document for the service variant as input for generating a web service client for the service variant. The web application server can create a web service for the service variant with an endpoint configuration that can be used to call the web service for the service variant.

In some implementations, the customer can publish (e.g., save or release) the web service for the service variant to a service registry or a UDDI registry. A publishing transaction used to publish a web service for the base enterprise service can also be used to publish the web service for the service variant. Once published, a plurality of users can access the published service variant for the base enterprise service. Additionally, a user may view and access a plurality of different published service variants for a particular base enterprise service. A user can access a web service for a service variant for a base enterprise service in the same manner as a web service for the base enterprise service. In some implementations, a service variant can be reclassified with its base service. A user, accessing a registry, can find all service variants that are associated with a given base service.

Referring again to FIG. 1, in some implementations, a user can run a browser application on a client (e.g., client 108) that can access an application server (e.g., application server 102). The user, by way of the browser application, can search for and run a web service based on a service variant. In some implementations, a display device (e.g., display device 112) can display a service variant user interface to the user. The service variant user interface can be similar to a base service user interface, excluding inputs, operations and output structures previously identified by the customer as not needed by the user. The user can then enter inputs, and select operations and output structures for the service variant. The user can run the business application for the base enterprise service for the service variant. At runtime, the web service for the service variant can provide the service variant the inputs, operations and output structures selected by the user to the base enterprise service implementation. In some implementations, a form, report or other type of document can provide an interface to a service variant. The user can enter inputs, select operations and output structures in the document. At runtime, the document can be used as the interface to the service variant.

The first time a user runs a web service for a service variant, glue coding can be generated at runtime that will run between the web service for the service variant and the base enterprise service implementation. The glue coding can receive the service variant inputs and add to them the pre-configured base service inputs (entered by the customer at the creation of the service variant). The glue coding can call the base enterprise service implementation providing it with all the inputs it needs to run. Subsequent running of the web service for the service variant can access the existing glue coding provided the service variant or the base enterprise service implementation remain the same as when the glue coding was generated. If either the service variant or the base enterprise service implementation change, the glue coding can be regenerated. In some implementations, the service variant editor can modify an existing service variant. For example, if a customer determines that a user no longer needs to enter a value for a particular input of the existing service variant, the customer can modify the existing service variant, setting a default value for the input and hiding it from the user. The customer can regenerate the existing service variant for subsequent use by the user.

In some implementations, the customer and the user may be the same entity. In some implementations, the customer and the user may be different entities. For example, a customer can provide a plurality of different service variants for a single base enterprise service for a variety of users. The customer can configure the service variants dependent on the needs of each customer using the base enterprise service. In another example, a customer can provide a single service variant for a base enterprise service to a plurality of users. In some implementations, a user may modify a service variant created by the customer.

Figure 2:
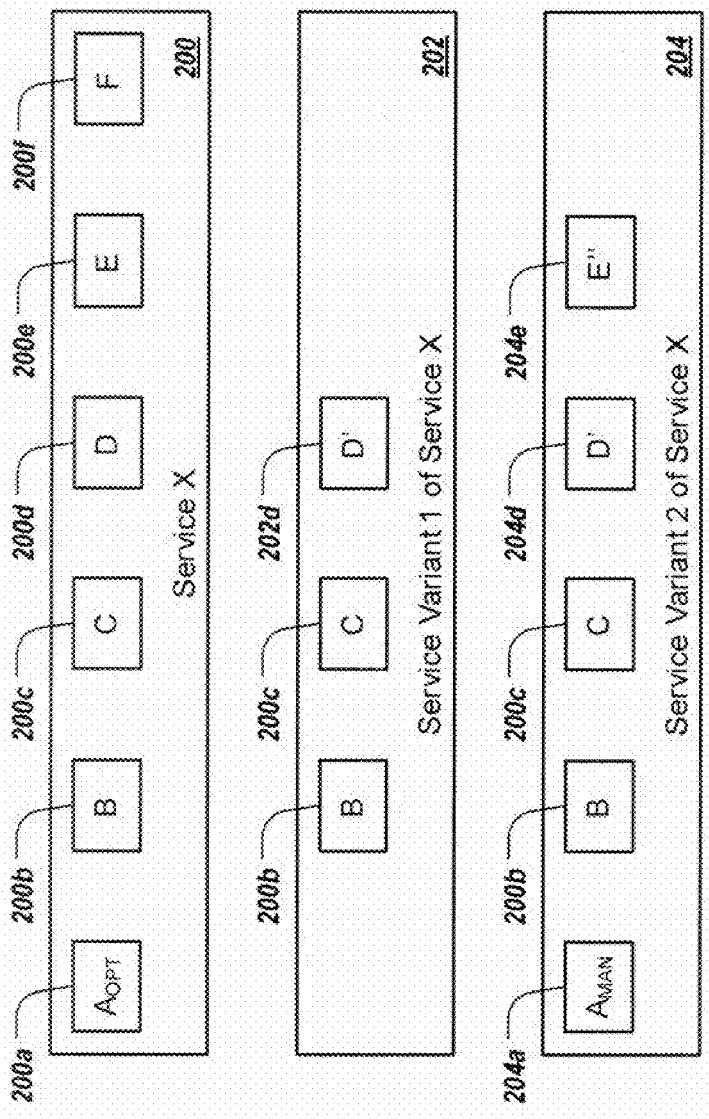
FIG. 2 is a schematic illustration of exemplar base inputs of a service and corresponding inputs of exemplar service variants.

Referring now to FIG. 2, a schematic illustration shows exemplar base inputs 200a-f to a service 200 and corresponding inputs 200b, 200c, 202d and 204a, 200b, 200c, 202d and 204e to exemplar service variants 202 and 204, respectively. For example, referring to FIG. 1, a user operating a client (e.g., client 108) and communicating with an application server (e.g., application server 102) by way of a network (e.g., network 106) can choose a business application to run on the application server (e.g., application server 102). The user can select an enterprise service (e.g., enterprise service 200) included in the business application to run on the application server 102. The enterprise service 200 can require the use of base inputs 200a-f. For example, the base inputs 200a-f can be associated with fields in a user interface for the enterprise service 200 that can be displayed on a display device (e.g., display device 112) included with the client (e.g., client 108). In another example, the base inputs 200a-f can be associated with fields in a form or other type of document. The base inputs 200a-f can include an optional input 200a. For example, the field for the optional input 200a can be provided to a user, however the entry of an input for the field by the user is not required.

In some implementations, a user operating a client (e.g., client 108) can enter values for base inputs 200a-f. In some implementations, a user may not need all six base inputs 200a-f for the enterprise service 200. In such an implementation, a service variant can be created that can hide fields for inputs as well as hide fields for the selection of output structures not needed by the user. The service variant can set fixed values for hidden fields. The service variant can define an optional field for use by the base enterprise service as a mandatory field for use by the service variant.

By way of non-limiting example, a customer may have one manufacturing facility. For example, input 200f can be an input field for the location of the manufacturing facility (e.g., Montreal) and input 200e can be associated with an output structure that includes specific information related to the manufacturing facility. Input 200d can be associated with a field in an output structure that includes the location of the manufacturing facility. Since the customer has one manufacturing facility, the location and name of the manufacturing facility will remain constant. Therefore, the user may not need to enter or select values for inputs 200d, 200e and 200f.

In some implementations, the customer can create a service variant 202 that includes inputs 200b, 200c and 202d. For example, referring to FIG. 1, a customer operating a client (e.g., client 108) and communicating with an application server (e.g., application server 102) by way of a network (e.g., network 106) can choose a business application (e.g., an application from the SAP® Business Suite applications) to run on the application server (e.g., application server 102). The customer can select an enterprise service (e.g., enterprise service 200) included in the business application to run on the application server 102. The customer can invoke a service variant editor (e.g., the customer invokes the ABAP™ transaction code SVAR in the ABAP™ Workbench (se80)). The service variant editor can display the service interface for the selected enterprise service (e.g., the base enterprise service). The service interface can include a plurality of fields for inputs, operations and output structures (e.g., inputs 200a-f).

The customer, using the service variant editor, can select the state of the inputs 200a-f, creating service variant 202. As provided in the above example, the customer can have a single manufacturing facility. The user may not need to enter a value for input 200f, the input field for the location of the manufacturing facility. Additionally, the user may not need to select an input value for input 200e, as there is only one manufacturing facility. The customer, using the service variant editor, can choose to hide inputs 200e and 200f. If the base enterprise service does not require input values for inputs 200e and 200f (e.g., the base enterprise service needs values for these inputs when a customer has more that one manufacturing facility), the service variant can hide inputs 200e and 200f (setting each of their field states to "hidden without fixed propagation value," for example). The service variant interface will not include fields for inputs 200e and 200f. The service variant will provide no input values for the hidden inputs 200e and 200f to the base enterprise service at runtime. Therefore, the user will not need to enter values for inputs 200e and 200f.

The customer, using the service variant editor, can choose to hide input 200d from the user. In this case, the base enterprise service may require an input value for input 200d. The base enterprise service may need to know if the field in the output structure associated with input 200d should be included in the output structure (e.g., the value for input 200d is "true") or not included in the output structure (e.g., the value for input 200d is "false"). The service variant can hide input 200d from the user and provide a fixed value for the input 200d (creating service variant input 202d, with a "hidden with fixed value propagation state" field state, for example) to the base enterprise service at runtime. The customer can select the fixed value for input 200d using the service variant editor. Using glue coding, as described above, the fixed value for input 202d can be input to the base enterprise service at runtime. The user will not see input 200d in the service variant interface and will not have to enter a value for input 200d.

For example, input 200a can be an optional input field for the base enterprise service. In order to simplify the selections and inputs a user may perform, the customer can choose to hide input 200a in service variant 202. Since the input 200a is optional, a value for the input 200a may not be provided to the base enterprise service at runtime.

The customer, using the service variant editor, can choose to set the field state of inputs 200b and 200c to "visible," for example. When the user invokes the service variant 202, fields for inputs 200b and 200c will be included in the service variant interface. Inputs 200d, 200e and 200f are not included in the service variant interface (e.g., they are hidden). Glue coding can receive the service variant inputs entered by the user (e.g., inputs 200b and 200c) and add to them the customer pre-configured base service inputs (e.g., inputs 200d, 200e, and 200f). The glue coding can call the base enterprise service implementation providing it with all the inputs it needs to run.

In some implementations, the customer can create a service variant 204 that includes inputs 204a, 200b, 200c, 204d and 204e. For example, referring to FIG. 1, a customer operating a client (e.g., client 108) and communicating with an application server (e.g., application server 102) by way of a network (e.g., network 106) can choose a business application (e.g., an application from the SAP® Business Suite applications) to run on the application server (e.g., application server 102). The customer can select an enterprise service (e.g., enterprise service 200) included in the business application to run on the application server 102. The customer can invoke a service variant editor (e.g., the customer invokes the ABAP™ transaction code SVAR in the ABAP™ Workbench (se80)). The customer, using the service variant editor, may choose to create an additional service variant for a base enterprise service.

For example, using the service variant editor, the customer can create service variant 204. For example, the customer can choose to make input 200a, an optional input, a mandatory input 204a in service variant 204 by changing its field state from optional to mandatory. The field for the mandatory input 204a is visible and the user must provide an input value for the mandatory input 204a.

The customer may choose to change the field state of input 200e from hidden to visible. Additionally, the customer may choose to rename the field for input 200c creating input 204e. For example, as described above, the input 200c can be associated with an output structure that includes specific information related to the manufacturing facility. The customer may want to include the location of the manufacturing facility in the output structure but may want to rename the output field from "Manufacturing facility location" to "Facility" as the customer has one manufacturing facility. The customer, as described above, can choose to hide input 200d from the user and provide a fixed value for the input 200d (creating service variant input 204d, with a "hidden with fixed value propagation state" field state, for example) to the base enterprise service at runtime. The customer can keep the field states for inputs 200b and 200c the same for the new service variant.

When the user invokes the service variant 204, the user will see the fields for inputs 204a, 200b, 200c and 204e in the service variant interface. Input 200f is not included in the service variant interface (e.g., it is hidden). Glue coding can receive the service variant inputs entered by the user (e.g., inputs 204a, 200b, 200c and 204e) and add to them the customer pre-configured base service inputs (e.g., inputs 202d and 200f). The glue coding can call the base enterprise service implementation providing it with all the inputs it needs to run.

Although not illustrated in FIG. 2, the service 200 can include base outputs, and the service variants 202, 204, can include corresponding outputs that are a sub-set of the base outputs. In this manner, the service variant can function as a filter to reduce the outputs that are presented to the user in response to execution of the underlying enterprise service.

In some implementations, a customer, using a service variant editor, may hide some of the base enterprise service operations from a user in order to simplify the user's interaction with the base enterprise service. In other implementations, a customer, using the service variant editor, may change the behavior or appearance of the fields in the interface for a base enterprise service when generating a service variant. For example, the customer may change the attributes or elements of a field in order to simplify the user's interaction with the base enterprise service. In some implementations, a WSDL document can be generated based on the definition of a service variant. For example, each field in the service variant interface can correspond to an entry in the XSD in the service variant WSDL. Hidden fields may not be included in the XSD document for the service variant.

In some implementations, when a new service variant is created there may be initial default states for the fields in the interface associated with the base enterprise service inputs. The customer can change the state of these fields when creating the service variant. In some implementations, the base enterprise service may change resulting in the addition of optional inputs and operations. The base enterprise service can remain compatible with existing service variants. The optional inputs and operations can have their field states set to an initial default value of "hidden without fixed value propagation." In some implementations, a customer can create a new service variant or modify an existing service variant for use with the updated base enterprise service that can change the state of the new additional optional inputs and operations.

FIGS. 3-6 illustrate screen-shots for an exemplar service variant editor that can be executed in accordance with implementations of the present disclosure. It is appreciated that the service variant editor illustrated in FIGS. 3-6 is merely exemplar in nature, and other service variant editors can be executed in accordance with implementations of the present disclosure.

Figure 3:
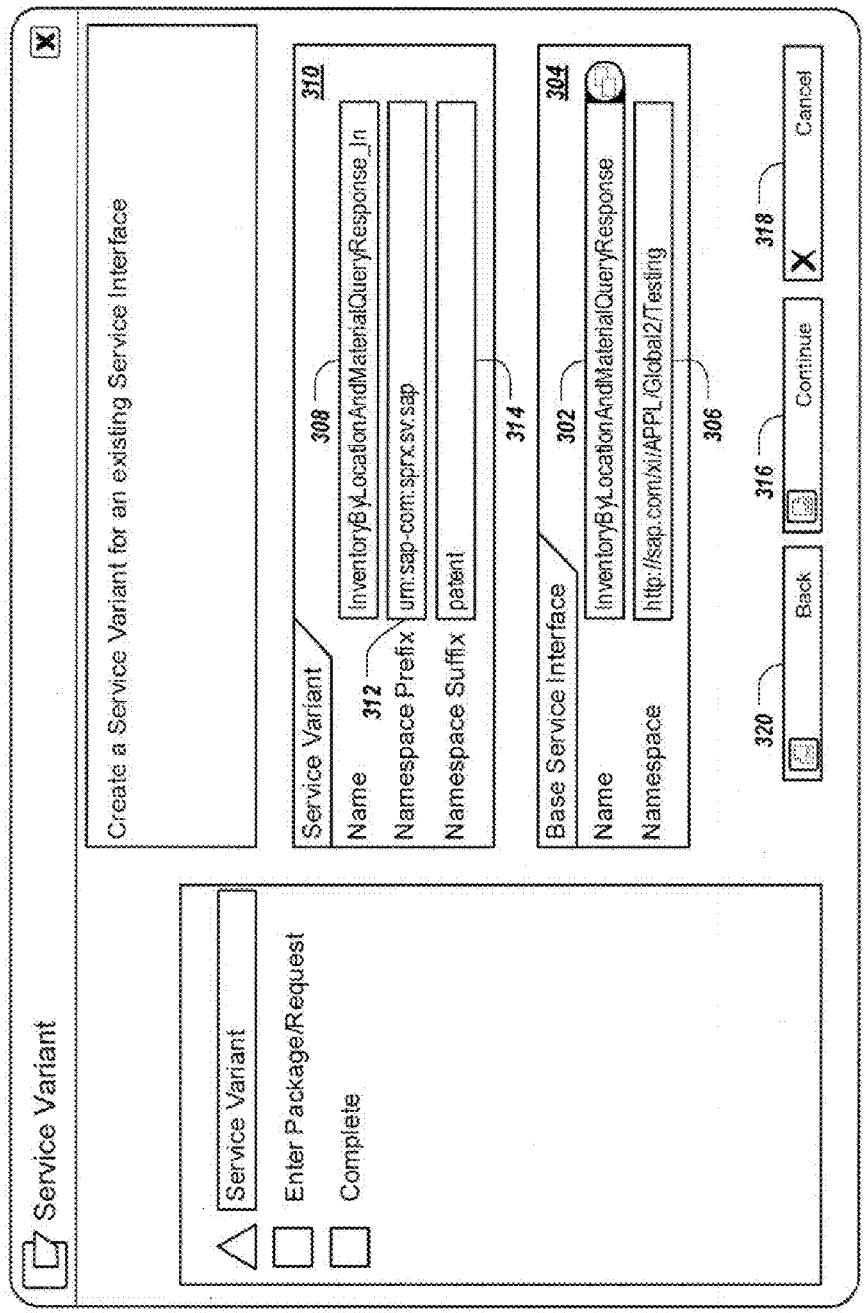
FIG. 3 is a screen-shot illustrating an exemplar wizard for a service variant in accordance with the present disclosure.

Referring now to FIG. 3, a screen-shot 300 illustrating an exemplar wizard for a service variant is shown in accordance with the present disclosure. For example, and referring to FIG. 1, a customer operating a client (e.g., client 108) and communicating with an application server (e.g., application server 102) by way of a network (e.g., network 106) can choose a business application (e.g., an application from the SAP® Business Suite applications) to run on the application server (e.g., application server 102). The customer can select an enterprise service (e.g., a Find Inventory by Location and Material inventory information service) included in the business application to run on the application server 102. The customer can invoke a service variant editor (e.g., the customer invokes the ABAP™ transaction code SVAR in the ABAP™ Workbench (se80)).

When the customer invokes the service variant editor to create a service variant for an existing base enterprise service, the display device (e.g., display device 108) on the client (e.g., client 108) can display an initial entry point screen for the SVAR transaction to the user. The user can enter a key name and namespace for a new service variant or the user can select a key name for an existing service variant. The key name can be the name of a proxy object used to map the data structure of the service variant. A proxy can represent a design time model interface for an object. For example, the design time model can be a service variant. The proxy object can be an implementation of the model. The user can also enter an external key name and namespace for the service variant. In some implementations, upon creation of the service variant, a proxy object (e.g., an ABAP object) is generated with an ABAP-key name. In some implementations, upon creation of the service variant, the proxy object generated can be a Java object with a Java-key name.

The customer can then invoke the service variant editor. The service variant editor can display the exemplar wizard for the service variant (e.g., screen-shot 300) on a display device (e.g., display device 108) on the client (e.g., client 108). The customer can use the exemplar wizard (e.g., shown by screen-shot 300) to create a service variant. The customer can use the service variant wizard to define an external key for a service variant based on a base enterprise service interface, package and prefix when creating a service variant.

Using the service variant wizard, the customer can select a base enterprise service from a name field 302 and a namespace field 306 included in a base service interface section 304. The qualified name for the base enterprise service can be the combination of the name and namespace.

A service variant section 310 includes a name field 308, a namespace prefix field 312 and a namespace suffix field 314. The customer can enter a name for the service variant they are creating in the name field 308 included in a service variant section 310. A fixed namespace prefix shown in the namespace prefix field 312 can be associated with the name of the service variant. In some implementations, the customer can chose the prefix as a customer-wide prefix. The namespace prefix 312 can be included in the namespace entry entered by the customer in the initial entry point screen for the SVAR transaction. In some implementations, the namespace prefix can depend on whether the namespace for the service variant is the namespace of the enterprise software supplier (e.g., SAP) or the customer (e.g., CUST). In some implementations, the namespace prefix can be the company name (e.g., IBM, Ford, etc.) for a customer. For example, the namespace prefix field 312 can include a fixed value to avoid naming conflicts with other registry services. The customer can enter a suffix for the namespace in the namespace suffix field 314.

Once the customer completes their entries, the customer can activate a continue button 316, which will initialize creation of the service variant. The customer can also choose to cancel the creation of the service variant by activating a cancel button 318. The customer can also choose to go back to a previous entry screen (e.g., the initial entry point screen for the SVAR transaction) by activating a back button 320.

Figure 4:
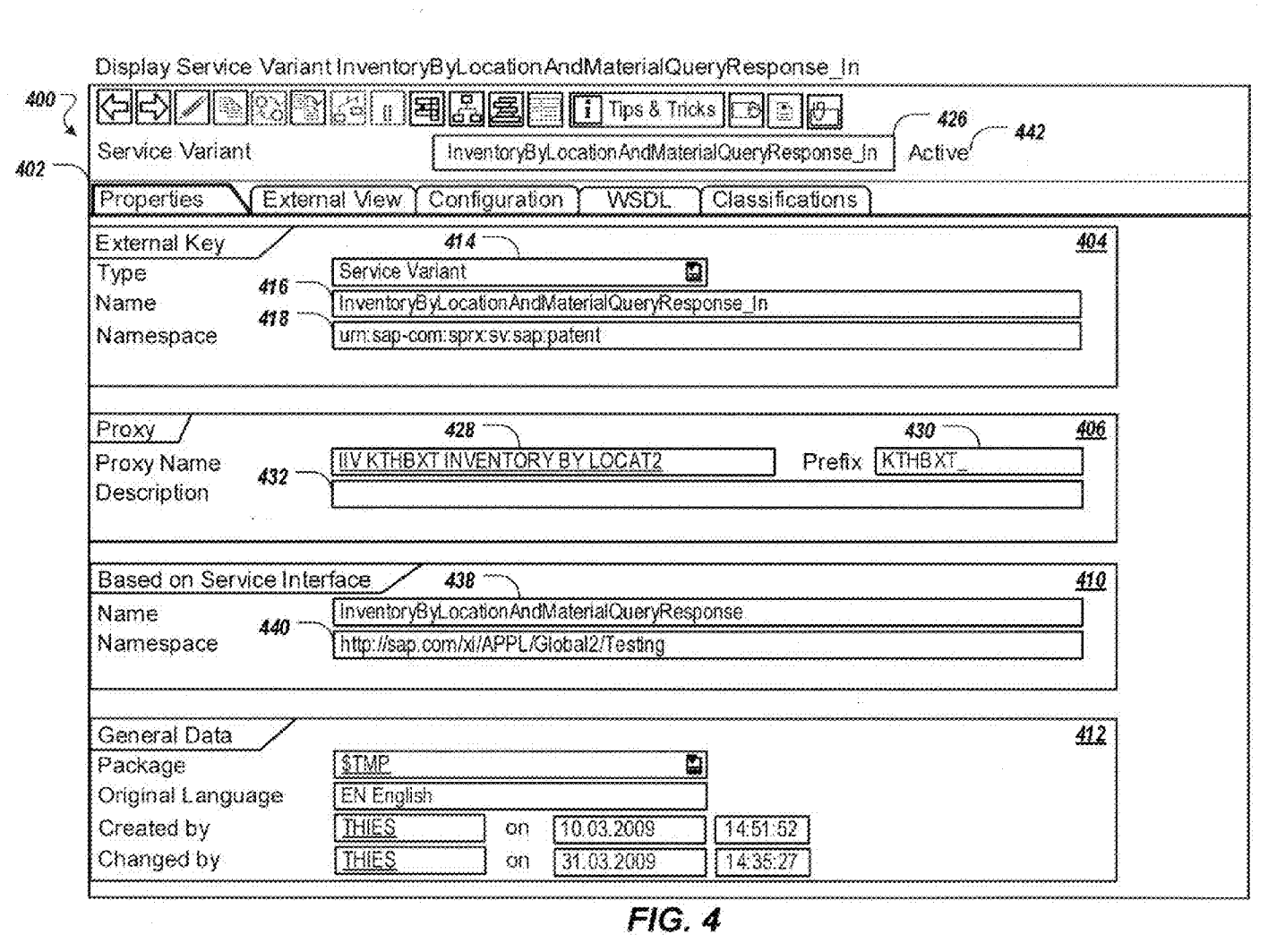

Referring now to FIG. 4, a screen-shot 400 illustrating a properties tab 402 of an exemplar editor for a service variant is shown. For example, and with co-reference to FIG. 3, when the customer activates the continue button 316 to create the service variant, the service variant wizard can invoke the service variant editor. A display device (e.g., display device 112) on a client (e.g., client 108) can display the properties tab 402 for the service variant editor. The service variant editor can include a field 426. The field 426 can include the name of the service variant (e.g., InventoryByLocationAndMaterialQueryResponse_In) created by the customer. Additionally, state indicator 442 can indicate the state of the service variant. In the example in FIG. 4, the service variant is in an active state (the service variant is saved and activated).

The properties tab 402 can display the properties for the service variant identified in the field 426. The properties tab 402 includes an external key section 404, a proxy section 406, an interface attributes section 408, a based on service interface 410 and a general data section 412.

The external key section 404 includes a type field 414, a name field 416 and a namespace field 418. The type field 414 indicates the external key is for a service variant. The name field 416 includes the name of the service variant. The namespace field 418 includes the namespace prefix for the service variant.

The proxy section 406 includes a proxy name field 428, a prefix field 430 and a description field 432. The proxy name field 428 indicates the name of a proxy object that can be used to map the data structure of the service variant. The prefix field 430 is the prefix for proxy object name. The description field 432 is an optional field that can include a description of the proxy object.

The based on service interface section 410 includes a name field 438 and a namespace field 440. The name field 438 includes the name for the base enterprise service for the service variant. The namespace field 440 indicates the namespace for the base enterprise service.

The general data section 412 can include general information for the service variant (e.g., package, language, and creation and change dates).

Figure 5:
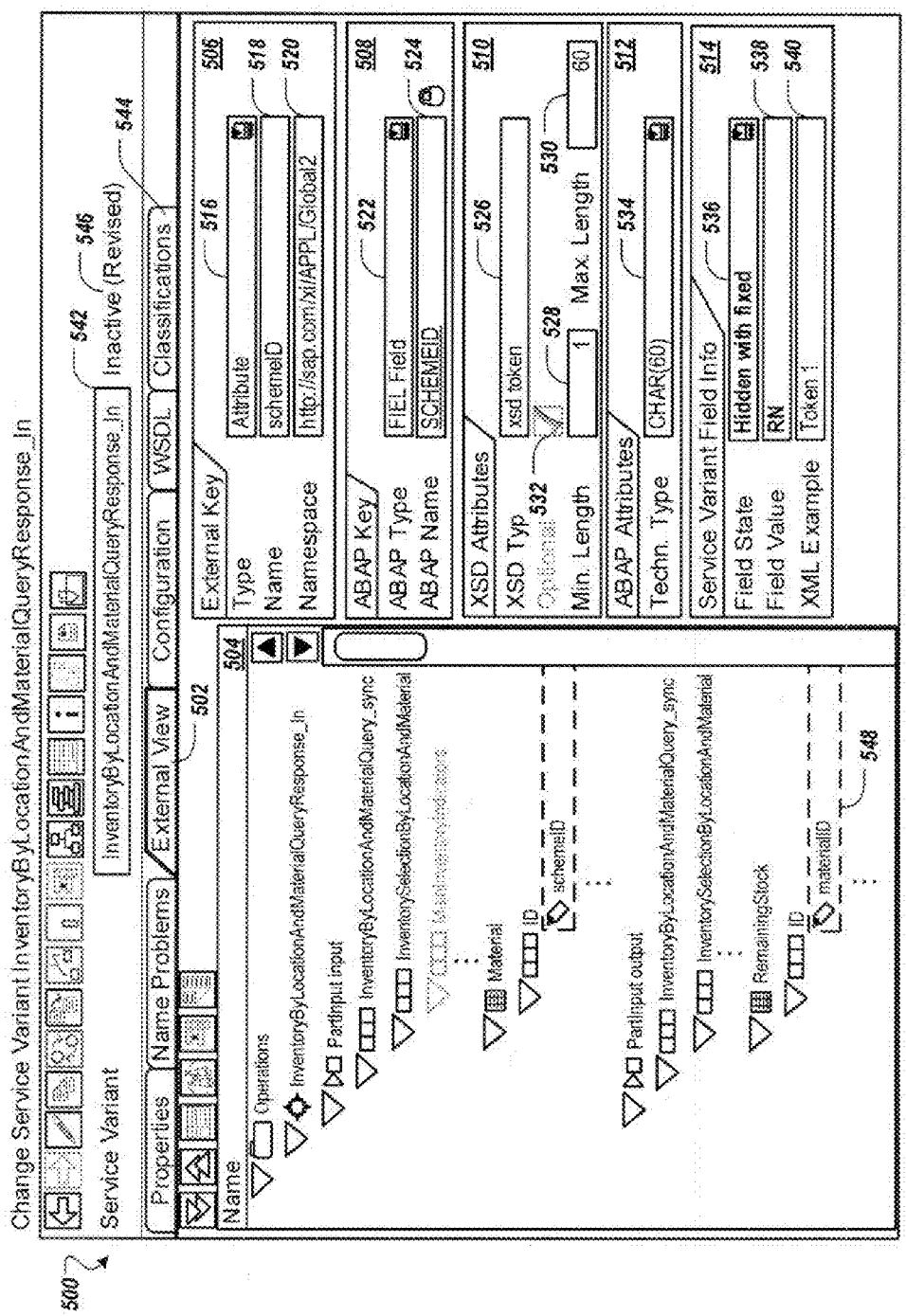
FIG. 5 is a screen-shot illustrating a detail view in an external view tab of an exemplar editor for a service variant.

Referring now to FIG. 5, a screen-shot 500 illustrating a detail view in an external view tab 502 of an exemplar editor for a service variant is shown. For example, and with co-reference to FIG. 3, when the customer activates the continue button 316 to create the service variant, the service variant wizard can invoke the service variant editor. The customer can select the external view tab 502, which can include a list of information for all inputs available for a base enterprise service. A display device (e.g., display device 112) on a client (e.g., client 108) can display the contents of the external view tab 502 to the customer. The service variant editor can include a field 542. The field 542 can include the name of the service variant (e.g., InventoryByLocationAndMaterialQueryResponse_In) being edited by the customer. Additionally, state indicator 546 can indicate the state of the service variant. In the example in FIG. 5, the service variant is in an inactive state (the service variant is being created or revised).

The external view tab 502 includes a name selection box 504. A customer can select an operation for the base enterprise service in the name selection box 504. Once selected, an expanded view can show the hierarchical structure of input fields, output structure fields and their states for the selected operation of the base enterprise service. For example, the detail view can display a hidden field in gray. For example, the detail view can display a visible field in black.

The customer can select an input field from within the hierarchy whose associated parameters and settings can be displayed in an external key section 506, an ABAP key section 508, a XSD attributes section 510, an ABAP attributes section 512 and a service variant field information section 514. The parameters and settings displayed for the input field can be the inputs used for the base enterprise service. For example, as shown in FIG. 5, the customer can select the "schemeID" input field for the InventoryByLocationAndMaterialQueryResponse_In service variant, which is based on the base enterprise service, InventoryByLocationAndMaterialQueryResponse. The parameters and settings for the external key section 506, the ABAP key section 508, the XSD attribute section 510, the ABAP attributes section 512 and the service variant field information section 514 can be automatically populated with the default values for the base enterprise service. The customer can modify available fields within the parameters and settings for the input field to create the service variant.

The external key section 506 includes a type field 516, a name field 518 and a namespace field 520. The name field 518 includes the name of an external key. The external key name is the name of the selected input for the service variant selected in the name selection box 504. The namespace field 520 indicates the namespace for the base enterprise service that includes the selected input. The type field 516 indicates a type for the selected input.

The ABAP key section 508 includes an ABAP type field 522 and an ABAP name field 524. The ABAP name field 524 displays the name of the selected input for the base enterprise service. The ABAP type field 522 indicates the ABAP type for the for the selected base enterprise service input.

The XSD attributes section 510 includes a XSD type field 526, a minimum length field 528, a maximum length field 530 and an optional check box 532. The XSD type field 526 indicates the XSD type for the WSDL document. The minimum length field 528 and the maximum length field 530 indicate the minimum and maximum XSD entry length in the WSDL document. The optional checkbox 532 (which is grayed-out and therefore unable to be changed in the example in FIG. 5) indicates if the selected input is optional. In the example of FIG. 5, the "schemeID" input field cannot be optional. For example, if the selected input field is optional, the customer could uncheck the optional check box 532 changing the state of the input field from optional to mandatory. The ABAP attributes section 512 includes the technical type field 534, which indicates the input type of the selected input.

The service variant field information section 514 includes a field state field 536, a field value field 538 and an Extensible Markup Language (XML) example field 540. The field state field 536 can initially show the default value for the field state (e.g., hidden with fixed value propagation) for the input (e.g., schemeID) for the base enterprise service. The field value field 538 can initially show the fixed value for propagation. In some implementations, the customer can change the fixed value for propagation to an alternative value for the input. In some implementations, the customer can select an alternative field state (e.g., hidden without fixed value propagation) for the selected input (e.g., schemeID) different from the field state for the base enterprise service. In this implementation, the customer need not enter a value in the field value field 538 as a value is not needed. The state change for the base service enterprise input can be saved in the service variant. The XML example field 540 shows an XML example for the XML format required for the XML data type.

The customer can select an operation for an output structure in the base enterprise service from the name selection box 504. For example, as shown in FIG. 5, the customer can select the "materialID" output structure field for the InventoryByLocationAndMaterialQueryResponse_In service variant, which is based on the base enterprise service, InventoryByLocationAndMaterialQueryResponse. The output structure for a base enterprise service can specify information and data that the service, once completed, can report to the user. The customer can select a field states for the output structure fields in a similar manner as field states for input fields (e.g., output structure field "materialID" can be visible (data will be reported to the user for this field) or hidden (data will not be reported to the user for this field and the field will be hidden (not shown to the user) in the output structure)).

Figure 6:
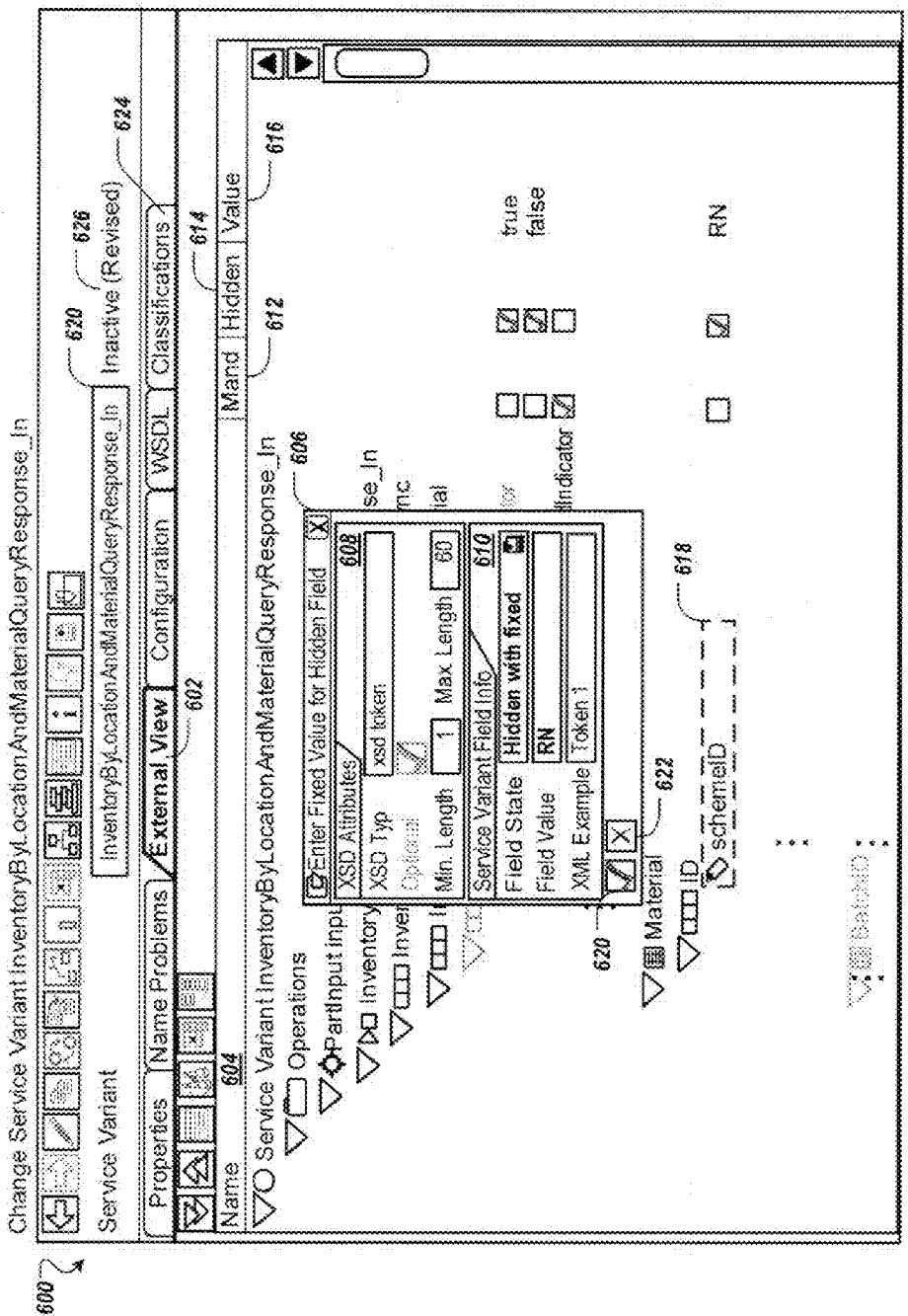
FIG. 6 is a screen-shot illustrating a field states overview in an external view tab of an exemplar editor for a service variant.

Referring now to FIG. 6, a screen-shot 600 illustrating a field states overview in an external view tab 602 of an exemplar editor for a service variant is shown. For example, and with co-reference to FIG. 3, when the customer activates the continue button 316 to create the service variant, the service variant wizard can invoke the service variant editor. The customer can select the external view tab 602, which can include a field states overview for all input fields available for a base enterprise service. A display device (e.g., display device 112)

on a client (e.g., client 108) can display the contents of the external view tab 602 to the customer. The service variant editor can include an field 620. The field 620 can include the name of the service variant (e.g., InventoryByLocationAndMaterialQueryResponse_In) being edited by the customer. Additionally, state indicator 626 can indicate the state of the service variant. In the example in FIG. 6, the service variant is in an inactive state (the service variant is being created or revised).

The field states overview can display to the customer the state of all fields for the inputs and output structures of the base enterprise service in the service variant. The external view tab 602 includes a name selection box 604. A customer can select an operation for the base enterprise service in the name selection box 604. Once selected, an expanded view can show the hierarchical structure of input fields for the selected operation in the base enterprise service along with the field states (e.g., mandatory 612, hidden 614, and if hidden with fixed value propagation, the value 616) for the input fields and output structures with respect to the service variant. For example, the field states overview can display a hidden field in gray. For example, the field states overview can display a visible field in black. The customer can select an input field (e.g., schemeID 618) from within the hierarchy. The service variant editor can display the parameters and settings associated with the selected input field in a pop-up window 606. In some implementations, the customer can select an output structure field.

The pop-up window 606 includes a XSD attributes section 608 and a service variant field information section 610. The entries can be the values for the input field for the base enterprise service. For example, as shown in FIG. 6, the customer selects the "schemeID" input field for the material operation for the InventoryByLocationAndMaterialQueryResponse_In service variant, which is based on the base enterprise service, InventoryByLocationAndMaterialQueryResponse. The fields in the XSD attribute section 608 and the service variant field information section 610 can be automatically populated with the default values for the input field for the base enterprise service. The customer can modify available fields within the pop-up window 606 for the selected input field to create the service variant as described with reference to FIG. 5. Once complete, if the customer chooses to accept the associated parameters and settings they can activate the check button 620. If the customer chooses not to accept the associated parameters and settings they can activate the delete button 622.

In some implementations, a customer can toggle between the detail view for an external view tab included in a service variant editor (e.g., external tab 502 in FIG. 5) and the field states overview for the external view tab in the service variant (e.g., external tab 602 in FIG. 6).

Figure 7:
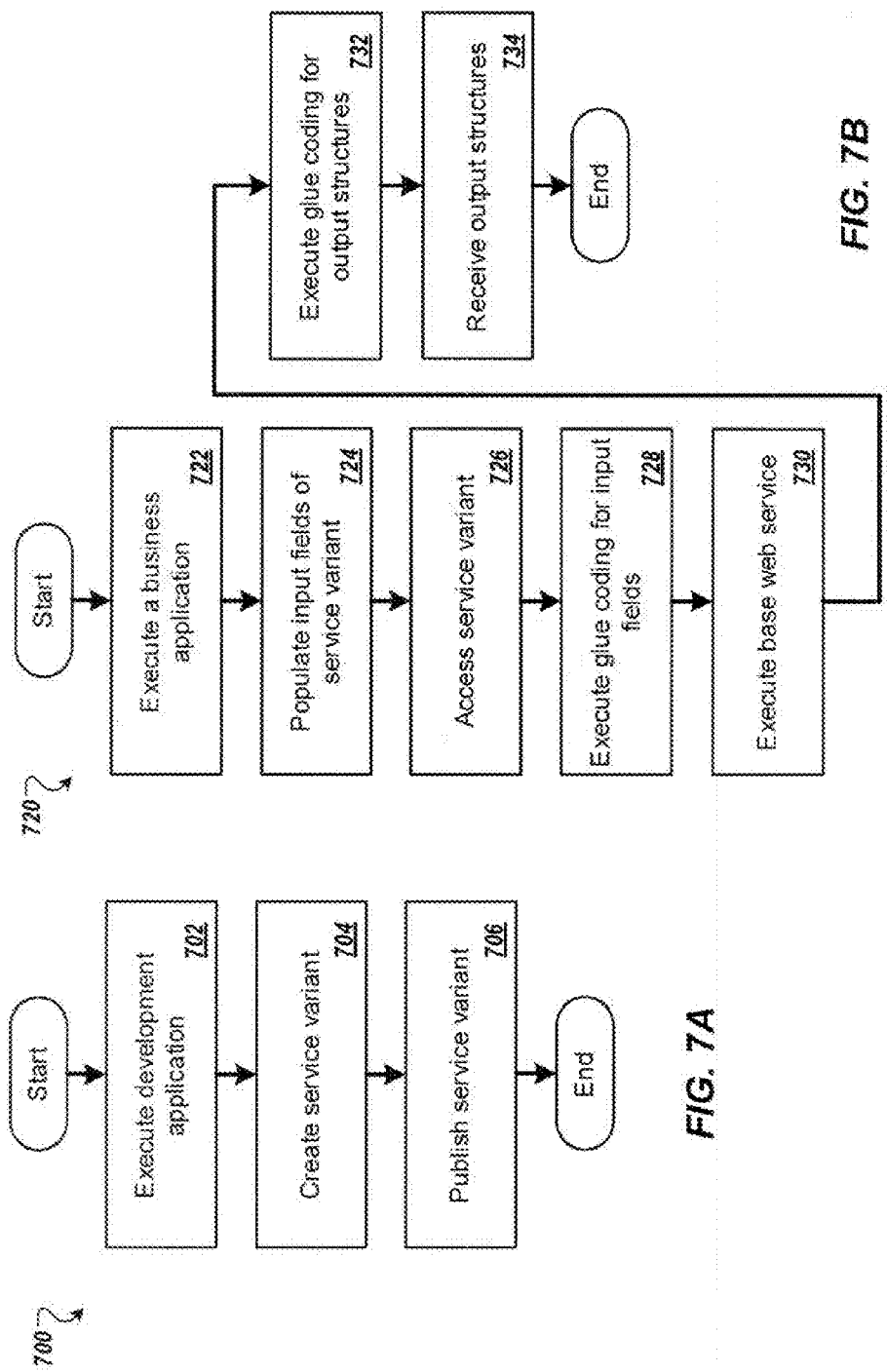
FIGS. 7A and 7B are flowcharts illustrating exemplar steps that can be executed in accordance with implementations of the present disclosure.

FIG. 7A is a flowchart illustrating exemplar steps 700 that can be executed in accordance with implementations of the present disclosure. For example, the exemplar steps of FIG. 7A may be implemented using software instructions stored in a computer-readable storage medium and executed by a processing system including one or more processing apparatus, or processors.

In step 702, a customer may execute a development application on a client device. For example, referring to FIG. 1, a customer operating a client (e.g., client 108) and communicating with an application server (e.g., application server 102) by way of a network (e.g., network 106) can choose a development application (e.g., SAP® ABAP™ Workbench (se80) application) to run on the application server (e.g., application server 102). The customer can invoke a service variant editor (e.g., the customer invokes the ABAP™ transaction code SVAR in the ABAP™ Workbench (se80)). Using the service variant editor, as described with reference to FIGS. 3-6, the customer can create a service variant that includes a plurality of input fields in step 704. In creating the service variant, the customer can store data for generating glue coding when the service variant is accessed at runtime. In step 706, the customer can publish the service variant to the service registry for future runtime access.

FIG. 7B is a flowchart illustrating exemplar steps 720 that can be executed in accordance with implementations of the present disclosure. For example, the exemplar steps of FIG. 7B may be implemented using software instructions stored in a computer-readable storage medium and executed by a processing system including one or more processing apparatus, or processors.

In step 722, a user may execute a business application on a client device. For example, referring to FIG. 1, a user operating a client (e.g., client 108) and communicating with an application server (e.g., application server 102) by way of a network (e.g., network 106) can choose a business application (e.g., an application from the SAP® Business Suite applications) to run on the application server (e.g., application server 102). The user can select an enterprise service (e.g., a Find Inventory by Location and Material inventory information service) included in the business application to run on the application server 102.

In step 724, a user can populate the input fields in the interface for the enterprise service selected in the business application. For example, a client (e.g., client 108) can present a user interface to a user on a display device (e.g., display device 112). A plurality of input fields and output structure fields can be displayed based on the service variant. The user can populate the input fields in the service variant user interface.

In step 726, a user can access a first service variant by calling the service variant web service. For example, a user operating a client (e.g., client 108) and communicating with an application server (e.g., application server 102) by way of a network (e.g., network 106) can access the first service variant from the service registry, which calls the service variant web service. In step 728, glue coding for the input fields can be executed. As described with co-reference to FIG. 2, glue coding can receive the service variant inputs entered by the user and add to them the customer pre-configured base service inputs.

In step 730, the base enterprise service can be executed based on user-provided inputs to the plurality of input fields. The glue coding can call the base enterprise service implementation providing it with all the parameters it needs to run based on the service variant. In step 732, glue coding for the output structures can be executed. As described with co-reference to FIG. 2, glue coding can receive the service variant inputs entered by the user and add to them the customer pre-configured base service inputs to determine the contents of the output structures.

In step 734, the application can receive the output structures from the base enterprise service. For example, the output structures can be provided to the application. The application can provide the output structures to the user in the form of a report that includes the results of the operations performed by the base enterprise service.

In some implementations, a customer can select classifications for a service variant. By default, the service variant can receive the classification of its base enterprise service. Additionally, the service variant can include its own unique classification. The service variant can be tagged with the base enterprise service name. This tag or classification can be added to the service variant by the customer and cannot be deleted by the user. This allows the service variant to be saved in the service registry and found in the service registry as a service variant of the base enterprise service. Additional classifications of the service variant can be added or modified by the customer and the user. The service variant classification and the base enterprise service classification can be added to the service variant during the creation of the service variant. For example, the customer can view the classifications of the service variant in the classifications tab (e.g., classifications tab 544 in FIG. 5 and classifications tab 624 in FIG. 6).

For example, a user operating a client (e.g., client 108) and communicating with an application server (e.g., application server 102) by way of a network (e.g., network 106) can choose a business application to run on the application server (e.g., application server 102). The user can select a service variant for a base enterprise service included in the business application to run on the application server 102. The business application can call the web service for the service variant as it would call a web service for the base enterprise service as the web service for the service variant and the web service for the base enterprise service are available in a service registry. The business application can generate a client proxy for the service variant. The client proxy for the service variant can be a smaller version of the client proxy for the base enterprise service if the customer reduced the number of input parameters the user can enter in the service variant interface.

For example, and referring again to FIG. 1, an application server (e.g., application server 102) can host a web service. In some implementations, a user can call a web service for a service variant as it would call a web service for the base enterprise service as both the web service for the service variant and the web service for the base enterprise service are available to the user in a service registry. A client proxy can be generated for the service variant. The client proxy can call the web service.

Figure 8:
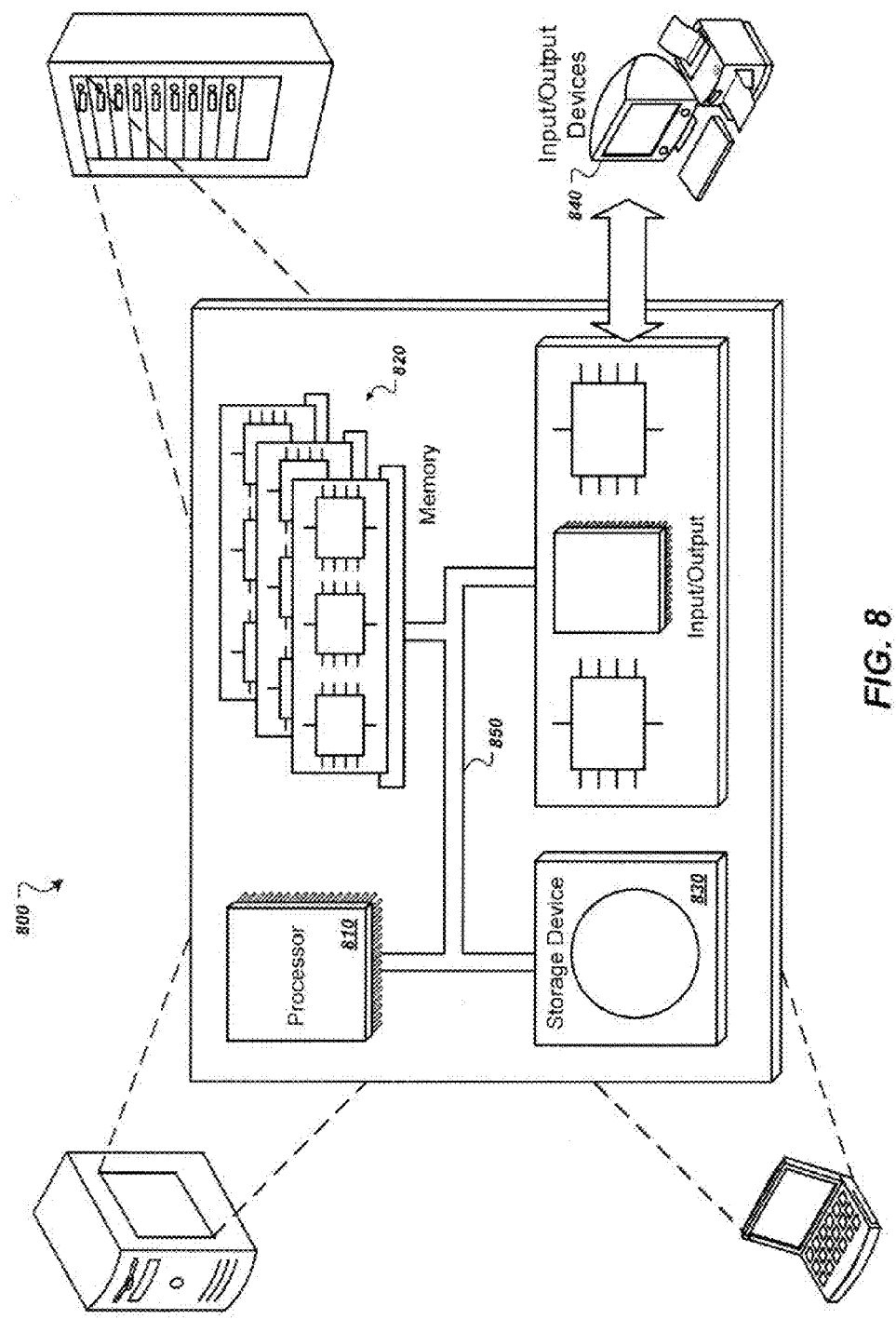
FIG. 8 is a schematic illustration of exemplar hardware components that can be used to execute implementations of the present disclosure Like reference symbols in the various drawings indicate like elements.

Referring now to FIG. 8, a schematic illustration of exemplar hardware 800 that can be used to execute implementations of the present disclosure is provided. The hardware 800 can be used for the operations described in association with methods described herein. For example, the hardware 800 may be provided within the application server 102. The hardware 800 includes a processor 810, a memory 820, a storage device 830, and an input/output device 840. Each of the components 810, 820, 830, and 840 are interconnected using a system bus 850. The processor 810 is capable of processing instructions for execution within the hardware 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the hardware 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the hardware 800. In one implementation, the storage device 830 is a computer-readable medium. In various different implementations, the storage device 830 may be a floppy disk device, a hard disk device, an optical disk device, or a tape device. The input/output device 840 provides input/output operations for the hardware 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
    executing a business application on a server device, the business application executing a service based on a base plurality of inputs that can be input to the business application;
    accessing a first service variant based on the service executing on the server device, the first service variant being accessed from a service registry on the server device, the service registry providing a plurality of different service variants, each service variant being generated based on the service and respective customer needs, each of the plurality of different service variants being executed on the server device, providing a customized version of the service, and defining a customized sub-set of inputs of the base plurality of inputs and customer pre-configured inputs of the base plurality of inputs that correspond to customer pre-configured values;
    providing a first user interface for display, the first user interface comprising a first plurality of input fields based on the first service variant, the first plurality of input fields corresponding to inputs of a first sub-set of inputs and being operable to receive values to be assigned to the inputs of the first sub-set of inputs, the first user interface being absent input fields corresponding to first customer pre-configured inputs that correspond to first pre-configured values;
    receiving first user input to each input field of the first plurality of input fields; and
    executing the service based on the first user input and the first pre-configured values on the server device.

2. The computer-implemented method of claim 1, wherein accessing a first service variant comprises executing glue coding based on the first service variant on the server device, and wherein the glue coding receives the first user input and adds the first user input to the first pre-configured values for the base plurality of inputs to determine contents of output structures.

3. The computer-implemented method of claim 1, further comprising generating the first service variant based on:
    establishing a base plurality of input fields that can be presented to a user, the base plurality of input fields corresponding to the base plurality of inputs; and
    at least one of setting a default value for an input of the base plurality of inputs, setting a fixed value for an input of the base plurality of inputs, hiding an input field of the base plurality of input fields when presenting the base plurality of input fields to the user, defining an optional input field of the base plurality of input fields as a mandatory input field, and renaming an input field of the base plurality of input fields.

4. The computer-implemented method of claim 1, further comprising:
    accessing a second service variant providing a second customized version of the service and defining a second sub-set of inputs of the base plurality of inputs to provide a second user interface comprising a second plurality of input fields, the second plurality of input fields corresponding to inputs of the second sub-set of inputs and having at least one input in common with the inputs of the first sub-set of inputs; and
    executing the service based on second user input that is input to each input field of the second plurality of input fields.

5. The computer-implemented method of claim 1, further comprising executing a service variant editor that is used to generate the first service variant.

6. The computer-implemented method of claim 1, further comprising:
    generating a web service definition language (WSDL) document based on the first service variant, the WSDL document being a model that describes the service executed by the business application;
    configuring a web service based on the first service variant to support client-server interaction over a network; and
    generating glue coding based on the first service variant.

7. The computer-implemented method of claim 1, further comprising generating a first plurality of output fields in response to execution of the service, the first plurality of output fields being based on the first service variant and being a sub-set of a base plurality of output fields associated with the service.

8. A non-transitory computer-readable storage medium coupled to one or more processors and having instructions stored thereon which, when executed by the one or more processors, cause the one or more processors to perform operations comprising:
    executing a business application on a server device, the business application executing a service based on a base plurality of inputs that can be input to the business application;
    accessing a first service variant based on the service executing on the server device, the first service variant being accessed from a service registry on the server device, the service registry providing a plurality of different service variants, each service variant being generated based on the service and respective customer needs, each of the plurality of different service variants being executed on the server device, providing a customized version of the service, and defining customized sub-set of inputs of the base plurality of inputs and customer pre-configured inputs of the base plurality of inputs that correspond to customer pre-configured values;
    providing a first user interface for display, the first user interface comprising a first plurality of input fields based on the first service variant, the first plurality of input fields corresponding to inputs of a first sub-set of inputs and being operable to receive values to be assigned to the inputs of the first sub-set of inputs, the first user interface being absent input fields corresponding to first customer pre-configured inputs that correspond to first pre-configured values;
    receiving first user input to each input field of the first plurality of input fields; and executing the service based on the first user input and the first pre-configured values on the server device.

9. The storage medium of claim 8, wherein accessing a first service variant comprises executing glue coding based on the first service variant on the server device, and wherein the glue coding receives the first user input and adds the first user input to the first pre-configured values for the base plurality of inputs to determine contents of output structures.

10. The storage medium of claim 8, wherein generating the first service variant comprises:
    establishing a base plurality of input fields that can be presented to a user, the base plurality of input fields corresponding to the base plurality of inputs; and
    at least one of setting a default value for an input of the base plurality of inputs, setting a fixed value for an input of the base plurality of inputs, hiding an input field of the base plurality of input fields when presenting the base plurality of input fields to the user, defining an optional input field of the base plurality of input fields as a mandatory input field, and renaming an input field of the base plurality of input fields.

11. The storage medium of claim 8, wherein the operations further comprise:
    accessing a second service variant providing a second customized version of the service and defining a second sub-set of inputs of the base plurality of inputs to provide a second user interface comprising a second plurality of input fields, the second plurality of input fields corresponding to inputs of the second sub-set of inputs and having at least one input in common with the inputs of the first sub-set of inputs; and
    executing the service based on second user input is input to each input field of the second plurality of input fields.

12. The storage medium of claim 8, wherein the operations further comprise executing a service variant editor used to generate the first service variant.

13. The storage medium of claim 8, wherein the operations further comprise:
    generating a web service definition language (WSDL) document based on the first service variant, the WSDL document being a model that describes the service executed by the business application;
    configuring a web service based on the first service variant to support client-server interaction over a network; and
    generating glue coding based on the first service variant.

14. The storage medium of claim 8, wherein the operations further comprise generating a first plurality of output fields in response to execution of the service, the first plurality of output fields being based on the first service variant and being a sub-set of a base plurality of output fields associated with the service.

15. A system, comprising:
    a server device that hosts a business application that executes a service based on a base plurality of inputs; and
    a non-transitory computer-readable storage medium coupled to one or more processors having instructions stored thereon which, when executed by the one or more processors, cause the one or more processors to perform operations comprising:
        executing a business application on the server device, the business application executing a service based on a base plurality of inputs that can be input to the business application;
        accessing a first service variant based on the service executing on the server device, the first service variant being accessed from a service registry on the server device, the service registry providing a plurality of different service variants, each service variant being generated based on the service and respective customer needs, each of the plurality of different service variants being executed on the server device, providing a customized version of the service, and defining a customized sub-set of inputs of the base plurality of inputs and customer pre-configured inputs of the base plurality of inputs that correspond to customer pre-configured values;
        providing a first user interface for display, the first user interface comprising a first plurality of input fields based on the first service variant, the first plurality of input fields corresponding to inputs of a first sub-set of inputs and being operable to receive values to be assigned to the inputs of the first sub-set of inputs, the first user interface being absent input fields corresponding to first customer pre-configured inputs that correspond to first pre-configured values;
        receiving first user input to each input field of the first plurality of input fields; and
        executing the service based on the first user input and the first pre-configured values on the server device.

16. The system of claim 15, wherein accessing a first service variant comprises executing glue coding based on the first service variant on the server device, and wherein the glue coding receives the first user input and adds the first user input to the first pre-configured values for the base plurality of inputs to determine contents of output structures.

17. The system of claim 15, wherein generating the first service variant comprises:
    establishing a base plurality of input fields that can be presented to a user, the base plurality of input fields corresponding to the base plurality of inputs; and
    at least one of setting a default value for an input of the base plurality of inputs, setting a fixed value for an input of the base plurality of inputs, hiding an input field of the base plurality of input fields when presenting the base plurality of input fields to the user, defining an optional input field of the base plurality of input fields as a mandatory input field, and renaming an input field of the base plurality of input fields.

18. The system of claim 15, wherein the operations further comprise:
    accessing a second service variant providing a second customized version of the service and defining a second sub-set of inputs of the base plurality of inputs to provide a second user interface comprising a second plurality of input fields, the second plurality of input fields corresponding to inputs of the second sub-set of inputs and having at least one input in common with the inputs of the first sub-set of inputs; and
    executing the service based on second user input that is input to each input field of the second plurality of input fields.

19. The system of claim 15, wherein the operations further comprise executing a service variant editor used to generate the first service variant.

20. The system of claim 15, wherein the operations further comprise:
    generating a web service definition language (WSDL) document based on the first service variant, the WSDL document being a model that describes the service executed by the business application;
    configuring a web service based on the first service variant to support client-server interaction over a network; and
    generating glue coding based on the first service variant.

21. The system of claim 15, wherein the operations further comprise generating a first plurality of output fields in response to execution of the service, the first plurality of output fields being based on the first service variant and being a sub-set of a base plurality of output fields associated with the service.

* * * * *